United States Patent
Hatanaka et al.

(10) Patent No.: US 9,489,589 B2
(45) Date of Patent: Nov. 8, 2016

(54) INFORMATION PROCESSING APPARATUS AND CONTROL METHOD THEREOF

(71) Applicants: FUJITSU LIMITED, Kawasaki-shi, Kanagawa (JP); The University of Tokyo, Tokyo (JP)

(72) Inventors: Kohei Hatanaka, Fujisawa (JP); Toshiaki Hisada, Tokyo (JP); Seiryo Sugiura, Tokyo (JP); Takumi Washio, Tokyo (JP); Jun-ichi Okada, Tokyo (JP)

(73) Assignees: FUJITSU LIMITED, Kawasaki (JP); The University of Tokyo, Tokyo (JP)

( * ) Notice: Subject to any disclaimer, the term of this patent is extended or adjusted under 35 U.S.C. 154(b) by 2 days.

(21) Appl. No.: 14/546,073

(22) Filed: Nov. 18, 2014

(65) Prior Publication Data

US 2015/0146954 A1 May 28, 2015

(30) Foreign Application Priority Data

Nov. 28, 2013 (JP) ................ 2013-245659

(51) Int. Cl.
*G06K 9/00* (2006.01)
*G06K 9/46* (2006.01)
(Continued)

(52) U.S. Cl.
CPC ........... *G06K 9/4647* (2013.01); *G06T 7/0012* (2013.01); *G06T 7/0081* (2013.01); *G06T 7/0093* (2013.01); *G06T 7/408* (2013.01); *G06T 2200/04* (2013.01); *G06T 2207/10072* (2013.01); *G06T 2207/10081* (2013.01);
(Continued)

(58) Field of Classification Search
CPC combination set(s) only.
See application file for complete search history.

(56) References Cited

U.S. PATENT DOCUMENTS 7,590,273 B2 * 9/2009 Kubota .................... G06K 9/44
378/15
7,711,172 B2 * 5/2010 Kubota .................. G06K 9/342
378/62

(Continued)

FOREIGN PATENT DOCUMENTS

JP 2004-520923 7/2004
JP 2004-267584 9/2004

(Continued)

OTHER PUBLICATIONS

Extended European Search Report issued Apr. 14, 2015 in Patent Application No. 14191940.7.

(Continued)

*Primary Examiner* — Anand Bhatnagar
(74) *Attorney, Agent, or Firm* — Oblon, McClelland, Maier & Neustadt, L.L.P.

(57) ABSTRACT

An information processing method includes: converting voxel data to node data in which a voxel, which has a brightness value that is outside a certain brightness value range, is set as a first node, and a voxel, which has a brightness value that is within the certain brightness value range, is set as a second node that has a capability to extract relating nodes based on a neighborhood relationship between voxels; performing, for each second node, a calculation processing to calculate an output value of a reaction-diffusion equation by using a value corresponding to a brightness value of the second node and values corresponding to brightness values of relating nodes extracted from the second node, a predetermined number of times; and determining a brightness value of each second node from the output value of the reaction-diffusion equation after performing the calculation processing the predetermined number of times.

18 Claims, 11 Drawing Sheets

(51) Int. Cl.
*G06T 7/40* (2006.01)
*G06T 7/00* (2006.01)

(52) U.S. Cl.
CPC ............... *G06T 2207/20021* (2013.01); *G06T 2207/20072* (2013.01); *G06T 2207/20141* (2013.01); *G06T 2207/30004* (2013.01)

(56) References Cited

U.S. PATENT DOCUMENTS

| | | | | |
|---|---|---|---|---|
| 7,720,271 | B2* | 5/2010 | Kubota | G06K 9/34 378/15 |
| 7,930,152 | B2* | 4/2011 | Coffey | B82Y 10/00 703/13 |
| 8,165,369 | B2* | 4/2012 | Kubota | G06T 7/0012 382/128 |
| 2003/0187594 | A1* | 10/2003 | Sherman | G06F 19/701 702/27 |
| 2004/0175034 | A1 | 9/2004 | Wiemker et al. | |
| 2005/0008212 | A1* | 1/2005 | Ewing | G06T 7/0046 382/133 |
| 2006/0228014 | A1* | 10/2006 | Kubota | G06K 9/34 382/131 |
| 2008/0137970 | A1* | 6/2008 | Kubota | G06K 9/342 382/224 |
| 2009/0092302 | A1* | 4/2009 | Kubota | G06T 7/0012 382/128 |
| 2012/0301053 | A1 | 11/2012 | Watanabe et al. | |

FOREIGN PATENT DOCUMENTS

| | | |
|---|---|---|
| JP | 2008-009549 | 1/2008 |
| JP | 2012-245085 | 12/2012 |

OTHER PUBLICATIONS

Theeraphol Wattanavekin, et al., "Exploration in a Boundary Environment with Unknown Obstacles Using Reaction-Diffusion Equation on a Graph" Proceedings of the 2011 IEEE International Conference on Robotics and Biomimetics, XP032166198, Dec. 7, 2011, pp. 2623-2628.

Gerlind Plonka, et al., "Nonlinear Regularized Reaction-Diffusion Filters for Denoising of Images With Textures" IEEE Transactions on Image Processing, vol. 17, No. 8, XP011247523, Aug. 1, 2008, pp. 1283-1294.

Alain Tremeau et al. "A Region Growing and Merging Algorithm to Color Segmentation", Pattern Recognition, vol. 30, No. 7, 1997, 13 pages.

Luc Vincent "Morphological Grayscale Reconstruction in Image Analysis: Applications and Efficient Algorithms", IEEE Transactions on Image Processing, vol. 2, No. 2, 1993. 26 pages.

* cited by examiner

INFORMATION PROCESSING APPARATUS AND CONTROL METHOD THEREOF

CROSS-REFERENCE TO RELATED APPLICATIONS

This application is based upon and claims the benefit of priority of the prior Japanese Patent Application No. 2013-245659, filed on Nov. 28, 2013, the entire contents of which are incorporated herein by reference.

FIELD

This invention relates to an information processing apparatus and an information processing method.

BACKGROUND

A cross section image (also called "a tomographic image") that is obtained by photographing each organ is outputted as brightness value information with a gray scale from a medical imaging equipment such as a Computed Tomography (CT) equipment, Magnetic Resonance Imaging (MRI) equipment, ultrasonic echo equipment or the like. Currently, a technique is being developed in which a region of a designated organ is extracted based on this brightness value information to put information such as the shape of the organ, the diameter of the vessel or the like to use. Moreover, plural images that are obtained by cutting the three-dimensional space are outputted from a medical diagnosis apparatus (e.g. CT and/or MRI) or ultrasonic measurement apparatus. By performing an image processing to extract a size of an organ to be diagnosed or the length of a disease portion for those images, images for the diagnosis are generated to use them for the diagnosis. On the other hand, as an input for numerical simulation for tracing the blood or the like, an organ model of the vessel is generated from this processing result, and is used.

Such image processing techniques also include a technique for a region extraction processing. Although there are various techniques for the region extraction processing, a technique for extracting regions using a reaction-diffusion equation also exists. However, in the conventional technique for extracting regions using the reaction-diffusion equations, calculation of the reaction-diffusion equation is repeated a lot of times for one pixel. However, when the number of pixels to be processed increases, the processing amount increases for that, and as a result, a problem occurs that the processing time grows longer.

Patent Document 1: Japanese Laid-open Patent Publication No. 2008-09549

Patent Document 2: Japanese Laid-open Patent Publication No. 2012-245085

SUMMARY

An information processing method relating to an aspect of this invention includes (A) converting voxel data to node data in which a voxel of the voxel data, which has a brightness value that is outside a certain brightness value range to be focused on, is set as a first node that represents that the brightness value of the voxel is outside the certain brightness value range, and a voxel of the voxel data, which has a brightness value that is within the certain brightness value range, is set as a second node that has a capability to extract relating nodes that are based on a neighborhood relationship between voxels; (B) performing, for each second node included in the node data, a calculation processing to calculate an output value of a reaction-diffusion equation by using a value corresponding to a brightness value of the second node and values corresponding to brightness values of relating nodes extracted from the second node, a predetermined number of times; and (C) determining a brightness value of each second node from the output value of the reaction-diffusion equation after performing the calculation processing the predetermined number of times.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Figure 1:
FIG. 1 is a diagram depicting an example of a tomographic image.
Figure 2:
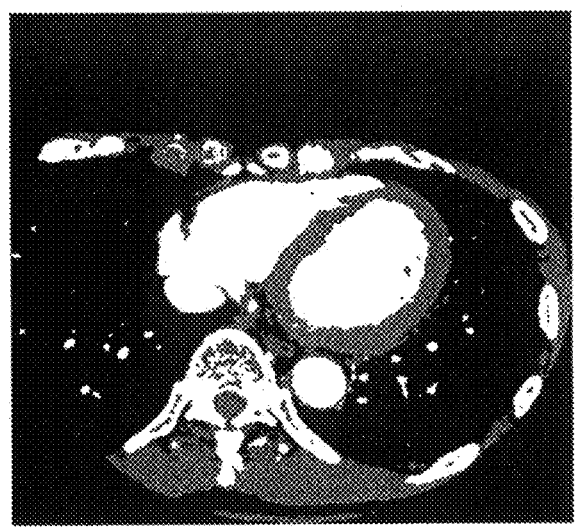
FIG. 2 is a diagram depicting a processing result of a region extraction processing using a reaction-diffusion equation.

Firstly, an outline of an embodiment of this invention will be explained by using FIGS. 1 to 3C. When a region extraction processing using the reaction-diffusion equation is performed for a tomographic image illustrated in FIG. 1, an image illustrated in FIG. 2 is obtained. As understood when comparing these images, the great majority is a region that does not change from black, and a region that is white, however, does not change, also exists.

In this embodiment, by handling the regions that do not change as nontarget regions, the entire processing is accelerated.

Figure 3A:
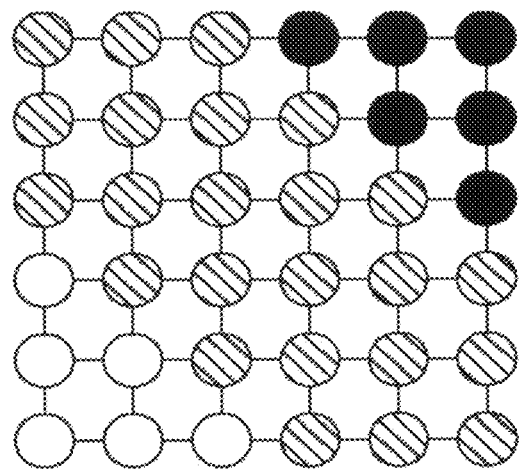
FIG. 3A is a diagram schematically depicting of voxel data.

More specifically, as illustrated in FIG. 3A, in voxel data obtained from the medical imaging equipment or the like, voxels are disposed in a cubic lattice (or grid) manner. As explained later, in order to calculate the brightness value at a next time for a specific voxel based on the reaction-diffusion equation, the brightness values of adjacent voxels (in the two-dimensional space, 4 adjacent voxels, and in the three-dimensional space, 6 adjacent voxels) to the specific voxel are used.

In this embodiment, regions to be focused on are identified from the brightness values of the voxels. Here, voxels that are diagonally hatched are identified as the regions to be focused on. As for black voxels other than the regions to be focused on (voxels whose brightness value is equal to or greater than an upper limit of the brightness value, which defines the region to be focused on) and white voxels (voxels whose brightness value is equal to or less than a lower limit of the brightness value, which defines the region to be focused on), the brightness value is fixed to the designated value in order not to change the brightness value. In other words, by excluding the voxels outside the regions to be focused on from the regions for which the calculation of the reaction-diffusion equation is performed, the calculation amount is reduced. However, as described above, in order to calculate the brightness value at the next time for a specific voxel, the brightness values of the adjacent voxels are used. Therefore, the neighborhood relationship is managed.

As schematically illustrated in FIG. 3E, only voxels adjacent to the region to be focused on have to be left. However, because only the neighborhood relationship has to be correctly grasped and brightness values of adjacent voxels have to be obtained, there is no need to leave plural black voxels and plural white voxels, which have a fixed brightness value. In other words, as illustrated in FIG. 3C, nodes corresponding to the black voxels are integrated into one node, and all nodes corresponding to voxels in the region to be focused on, which were adjacent to the black voxels, are set so as to be adjacent to one black node. Similarly, nodes corresponding to the white voxels also are integrated into one node, and all nodes corresponding to voxels in the region to be focused on, which were adjacent to the white voxels, are set so as to be adjacent to one white node. By generating such a node structure, a calculation processing of the reaction-diffusion equation, for which the aforementioned fixed boundary condition is imposed, is performed.

Figure 4:
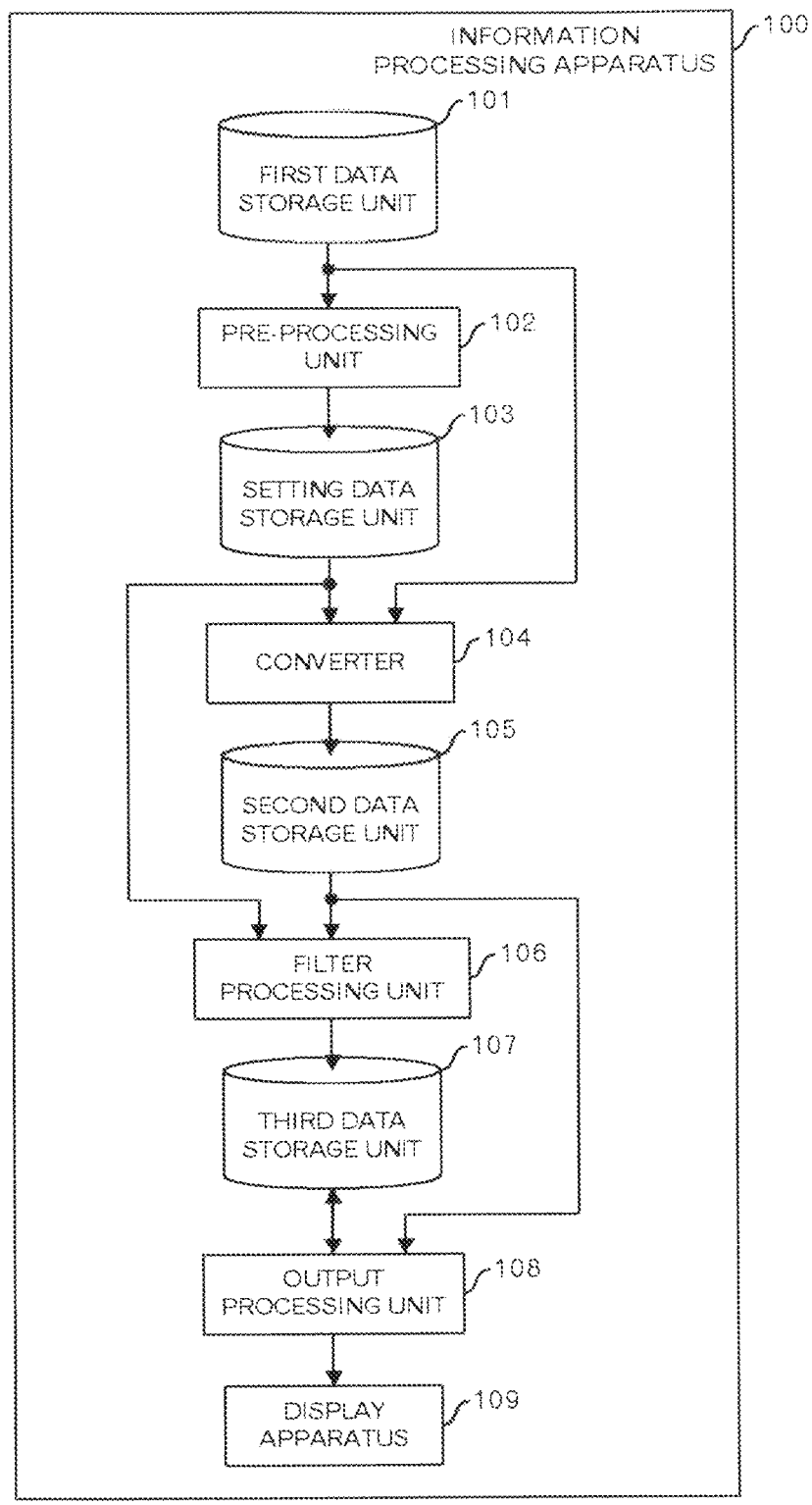
FIG. 4 is a functional block diagram of an information processing apparatus relating to this embodiment.

Next, FIG. 4 illustrates a functional block diagram of an information processing apparatus relating to this embodiment. The information processing apparatus 100 relating to this embodiment has a first data storage unit 101, a pre-processing unit 102, a setting data storage unit 103, a converter 104, a second data storage unit 105, a filter processing unit 106, a third data storage unit 107, an output processing unit 108 and a display apparatus 109.

The first data storage unit 101 stores voxel data such as tomographic images that are photographed by the medical imaging equipment or the like. The pre-processing unit 102 performs a processing for settings of various parameters for the voxel data stored in the first data storage unit 101, and stores values of parameters, which were set, into the setting data storage unit 103.

Figure 3B:
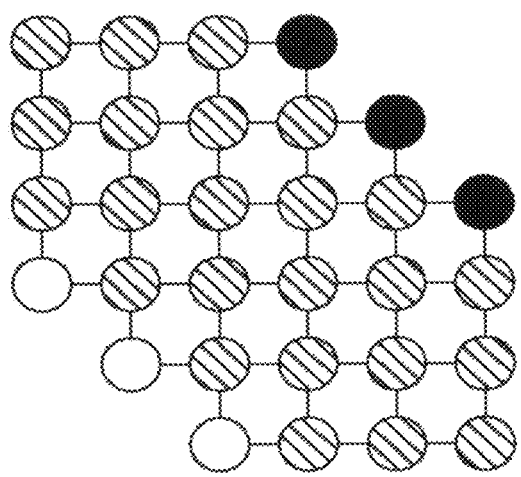
FIG. 3B is a diagram to explain an embodiment of this invention.
Figure 3C:
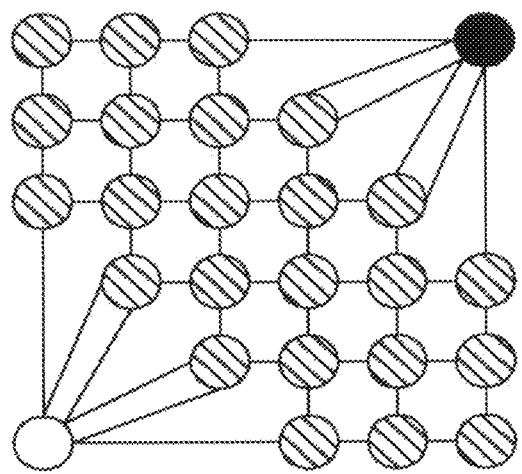
FIG. 3C is a diagram to explain the embodiment of this invention.

As described by using FIGS. 3A to 3C, the converter 104 performs a processing to convert the cubic-lattice voxel data to node data having a graph structure, and stores the processing result into the second data storage unit 105.

The filter processing unit 106 performs a calculation processing by the reaction-diffusion equation a predetermined number of times, and stores the processing result into the third data storage unit 107. The output processing unit 108 converts data stored in the third data storage unit 107 into data for rendering, and performs a rendering processing for the display apparatus 109.

Next, processing contents of the information processing apparatus 100 relating to this embodiment will be explained by using FIGS. 5 to 14.

Figure 5:
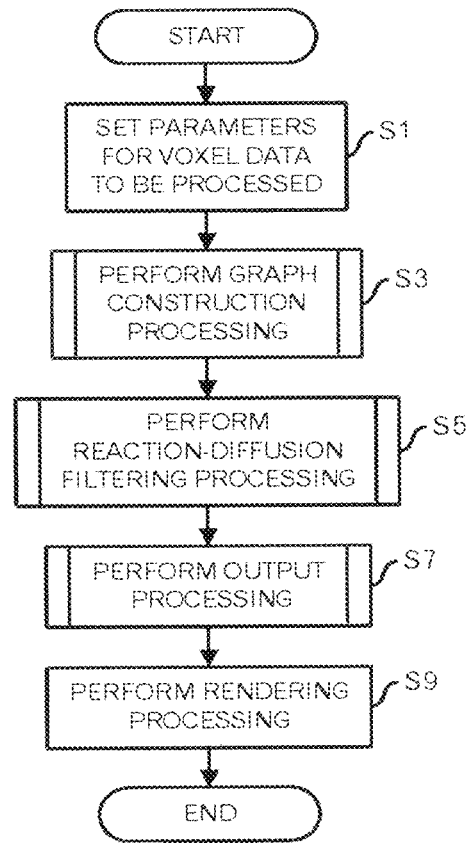
FIG. 5 is a diagram depicting a main processing flow relating to this embodiment.

The pre-processing unit 102 prompts a user to perform settings of various parameters for the voxel data stored in the first data storage unit 101, and stores inputted values of various parameters into the setting data storage unit 103 (FIG. 5: step S1). It is assumed that the voxel data includes $N_x$ voxels in the x-axis direction, $N_y$ voxels in the y-axis direction and $N_z$ voxels in the z-axis direction. Moreover, as v=(x, y, z) (in case of the two dimensional space, v=(x, y)), it is assumed that an initial brightness value is set to I(v).

Furthermore, in this embodiment, the user is caused to set parameters including the number of repetition times Tmax (e.g. 500) of the calculation by the reaction-diffusion equation, a unit time dt (e.g. 0.02), which is used when the calculation by the reaction-diffusion equation is repeated, coefficients α (e.g. 1.0) and β (e.g. 0.45) in the reaction-diffusion equation, thresholds a (e.g. 70), b (e.g. 120) and c (e.g. 150) of the brightness value in the reaction-diffusion equation, and the lower limit value I_low (e.g. 50) and upper limit value I_high (e.g. 180) in a brightness value range that defines the region to be focused on.

Figure 6:
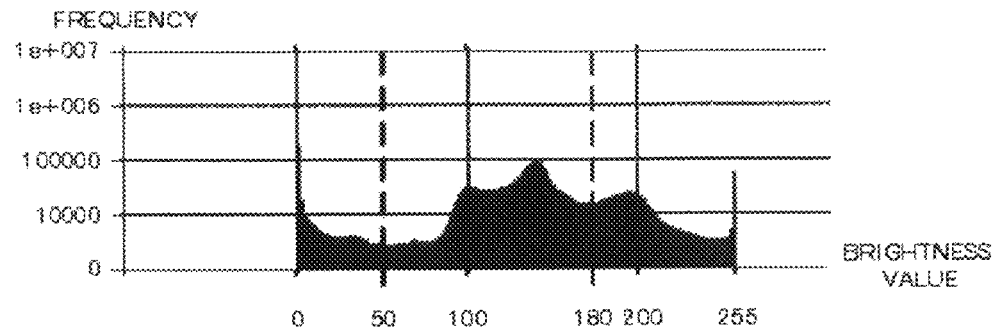
FIG. 6 is a diagram depicting an example of distribution of brightness-values.

For example, as illustrated in FIG. 6, a histogram based on a brightness value of each voxel in the voxel data may be presented for the user to prompt the user to set the lower limit value I_low and upper limit value I_high in the brightness value range and thresholds a, b and c of the brightness value in the reaction-diffusion equation. In an example of FIG. 6, the horizontal axis represents the brightness value, and the vertical axis represents the appearance frequency. I_low=50 and I_high=180 are set, however, voxels that have the brightness value of the highest appearance frequency are included in the region to be focused on.

The thresholds a, b and c of the brightness value are set between the lower limit value I_low and the upper limit value I_high. When the calculation processing by the reaction-diffusion equation is performed, values between the lower limit value I_low and the threshold a vary to the lower limit value I_low. Values between the threshold a and the threshold c vary to the threshold b. Values between the threshold c and the upper limit value I_high vary to the upper limit value I_high.

Next, the converter 104 uses data stored in the setting data storage unit 103 to perform a graph construction processing for the voxel data stored in the first data storage unit 101, and stores the processing result in the second data storage unit 105 (step S3). The graph construction processing will be explained by using FIGS. 7 to 12.

In the graph construction processing (FIG. 7), the converter 104 performs a node setting processing (step S11), and further performs a setting processing of the neighborhood relationship (step S13).

Figure 8:
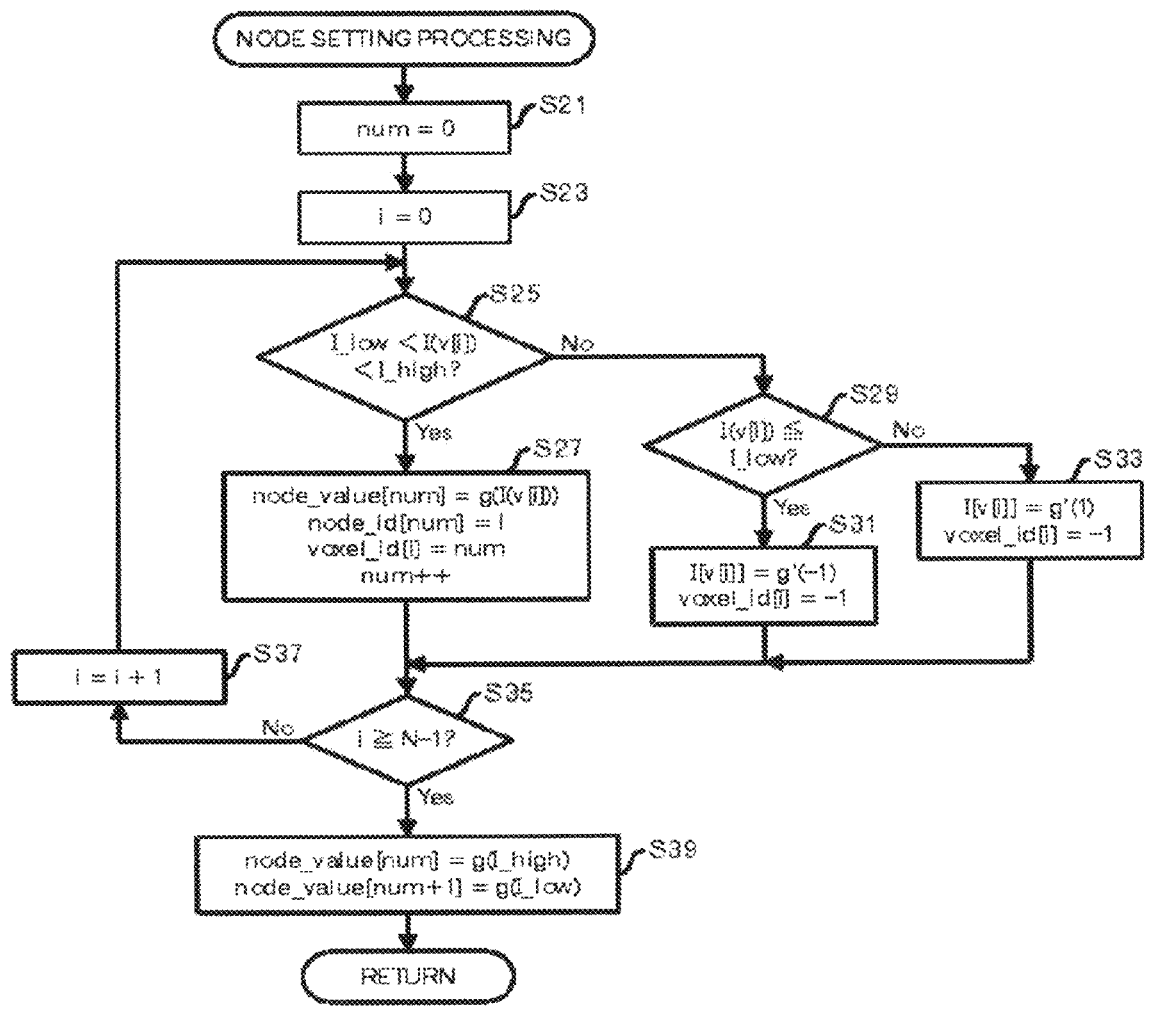
FIG. 8 is a diagram depicting a processing flow of a node setting processing.
Figure 7:
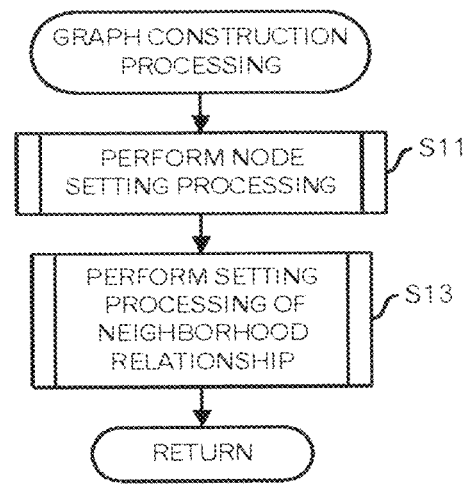
FIG. 7 is a diagram depicting a processing flow of a graph construction processing.

The node setting processing will be explained by using FIG. 8.

The converter 104 initializes a counter sum for the number of voxels in the region to be focused on to "0" (step S21). Moreover, the converter 104 initializes a counter i of the voxel ID to "0" (step S23).

Then, the converter 104 determines whether or not the brightness value I(v [i]) (the brightness value of the coordinates v of the voxel ID "i") is greater than the lower limit value I_low and less than the upper limit value I_high (step S25).

Figure 9:
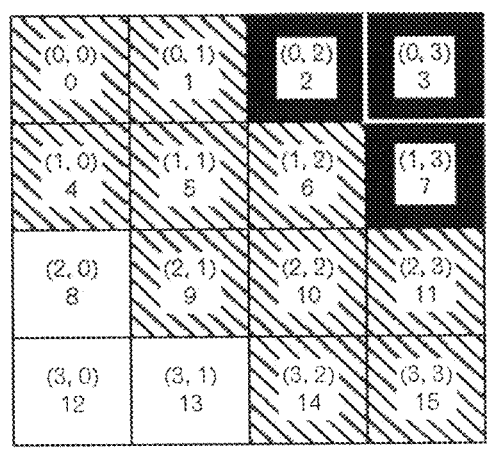
FIG. 9 is a diagram depicting an example of two-dimensional voxel data.

For example, an example of the two-dimensional voxel data is illustrated in FIG. 9. As for 4*4 voxels, the upper row represents the coordinates (x, y) and the lower row represents the voxel ID. The voxel with diagonal hatching represents a voxel within the region to be focused on, and furthermore, the black voxel is a voxel that has the brightness value that is equal to or greater than the upper limit value I_high, and the white voxel is a voxel that has the brightness value that is equal to or less than the lower limit value I_low.

Then, when the condition at the step S25 is satisfied, the converter 104 sets an array of node values node_value[num]=g(I(v[i])), sets an array to obtain the voxel number (or ID) from the node number (or ID) node_id[num]=i, sets an array to obtain the node number from the voxel number (or ID) voxel_id [i]=num, and further increments the value of the counter num by "1" (step S27). Then, the processing shifts to step S35.

g(X)=Y is a function to convert the brightness value X (e.g. from 0 to 25.5) to a corresponding value Y within a value range (from −1 to +1) of the reaction-diffusion equation. For example, g(X)=(2/255)X−1. g'(Y) is an inverse-function of g(X), which converts the value Y within the value range of the reaction-diffusion equation to the corresponding brightness value X.

On the other hand, when the condition at the step S25 is not satisfied, the converter 104 determines whether the brightness value I(v [i]) is equal to or less than the lower limit value I_low (step S29). When the condition at the step S29 is satisfied, the converter 104 sets I(v [i])=g'(−1) (or region ID "−1"), and further sets the array to obtain the voxel number from the node number voxel_id[i]=−1 (step S31). Then, the processing shifts to the step S35. voxel_id[i]=−1 represents that there is no corresponding node number.

Moreover, when the condition at the step S29 is not satisfied, because the I(v[i]) is equal to or greater than the upper limit value I_high, the converter 104 sets I(v[i])=g'(1) (or region ID "1"), and further sets an array to obtain the voxel number from the node number voxel_id[i]=−1 (step S33). Then, the processing shifts to the step S35.

After that, the converter 104 determines whether or not the counter i for the voxel ID is equal to or greater than the number of voxels N−1 (step S35). When i is less than N−1, the converter 104 increments i by "1" (step S37), and the processing returns to the step S25.

On the other hand, when i is equal to or greater than N−1, the converter 104 sets node_value[num]=g(I_high), and node_value[num+1]=g(I_low) (step S39). Then, the processing returns to a calling-source processing.

In other words, the node number num that is greater than the number of voxels in the region to be focused on by "1" is assigned to the node that is representative of the voxels that have the brightness value that is equal to or greater than the upper limit value I_high, and g(I_high) is set as the value of that node. Furthermore, the node number num+1 is assigned to the node that is representative of the voxels that have the brightness value that is equal to or less than the lower limit value I_low, and g(I_low) is set as the value of that node.

Hence, even when the values of the adjacent nodes are used in the calculation processing of the reaction-diffusion equation, that value can be read out.

Figure 10:
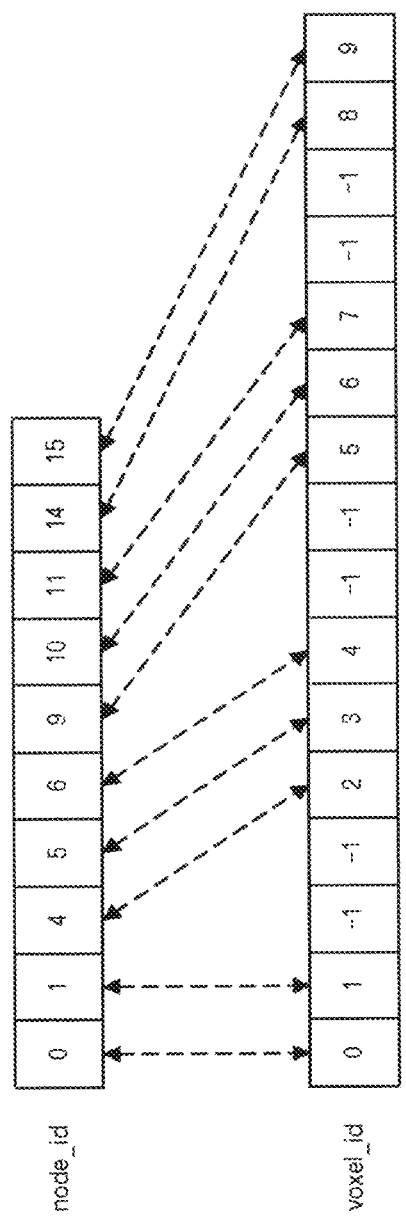
FIG. 10 is a diagram depicting an example of an array that represents node data.

By carrying out such a processing, array data as illustrated in FIG. 10 is obtained for the voxel data as illustrated in FIG. 9. The upper column in FIG. 10 represents the array node_id [num], and when the node number num is inputted, the corresponding voxel number i in the region to be focused on can be obtained. On the other hand, the lower column in FIG. 10 represents the array voxel_id[i], and when the voxel number i is inputted, the corresponding node number num can be obtained. However, when the voxel number of the voxel outside the region to be focused on is inputted, the node number "−1" is obtained. Therefore, it is understood that that voxel is outside of the region to be focused on.

Figure 11:
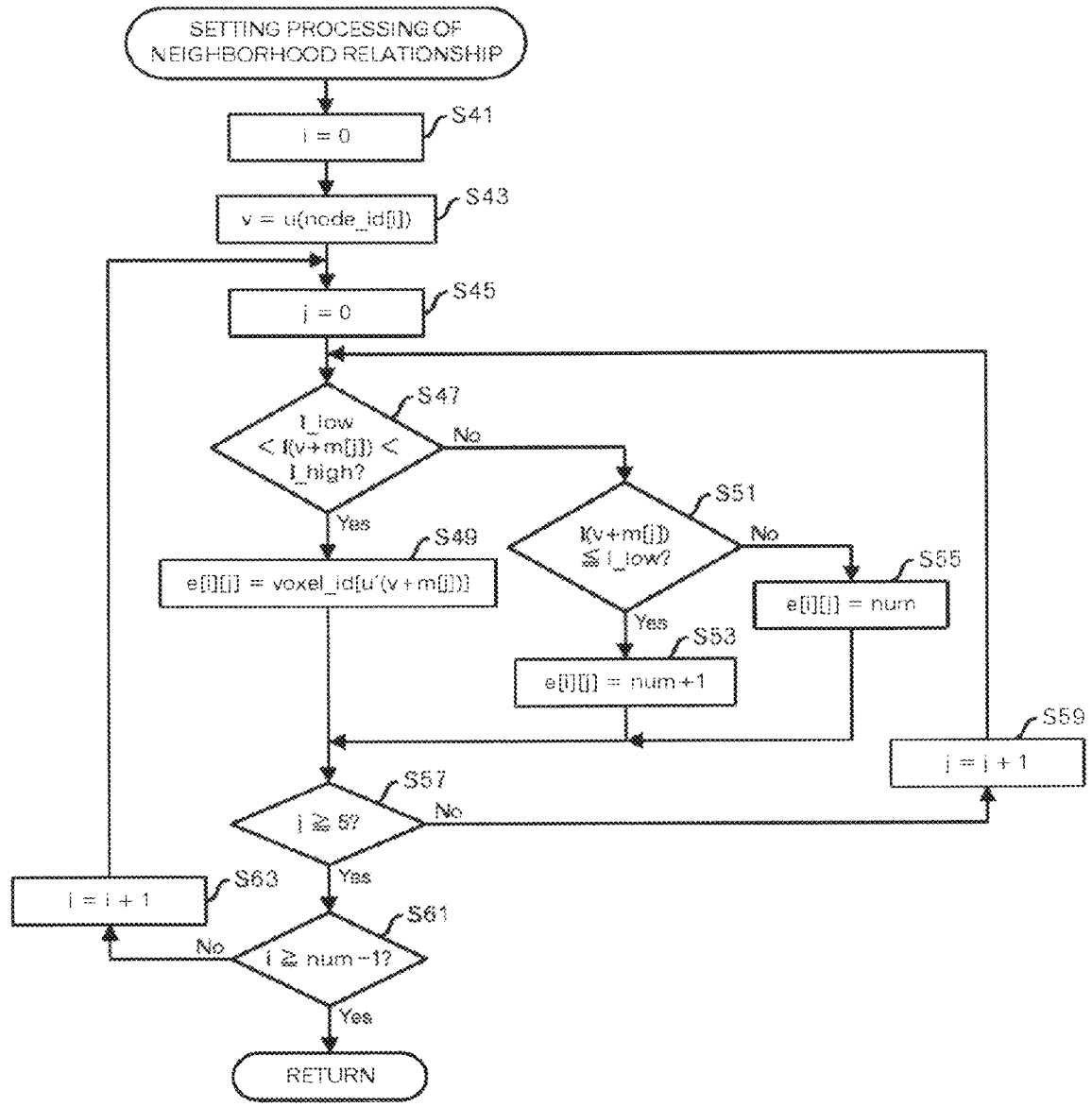
FIG. 11 is a diagram depicting a processing flow of a setting processing of a neighborhood relationship.

Next, the setting processing for the neighborhood relationship will be explained by using FIG. 11.

Firstly, the converter 104 initializes the counter i for the voxel number to "0" (step S41). Moreover, the converter 104 sets the coordinates of the voxel v=u(node_id[i]) (step S43). u(i) is a function that outputs the coordinates of that voxel from the voxel number i, and is represented as follows:

$$u(i)=(x=i\%(N_x*N_y)\%N_y, y=\text{floor}(i\%(N_x*N_y)/N_y), z=\text{floor}(i/(N_x*N_y)))$$

Here, % represents the calculation to calculate the remainder of the division, and floor represents a function to calculate the maximum integer that does not exceeds the value of the argument.

Incidentally, u' (v) is an inverse-function of u(i), and outputs a corresponding voxel number i when the coordinates v are inputted. For example, the function u' (v) is expressed as follows:

$$u'(v=(x,y,z))=x+N_x y+(N_x*N_y)*z$$

Moreover, the converter 104 initializes a counter j of the adjacent voxels to "0" (step S45).

After that, the converter 104 determines whether or not the brightness value I(v+m[j]) of the voxel v+m[j], which is adjacent to the voxel coordinates v to be focused on is greater than the lower limit value I_low and less than the upper limit value I_high (step S47). In case of the three-dimensional space, m[j]={(0, 0, 1), (1, 0, 0), (0, 1, 0), (−1, 0, 0), (0, −1, 0), (0, 0, −1)}. In case of the two-dimensional space, m[j]={(1, 0), (0, 1), (−1, 0), (0, −1)}.

Figure 12:
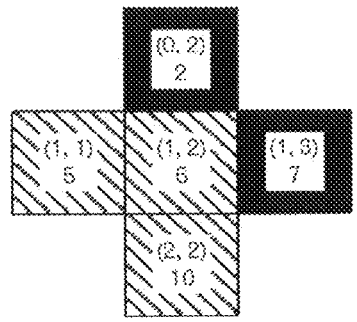
FIG. 12 is a diagram to explain adjacent voxels.
Figure 14:
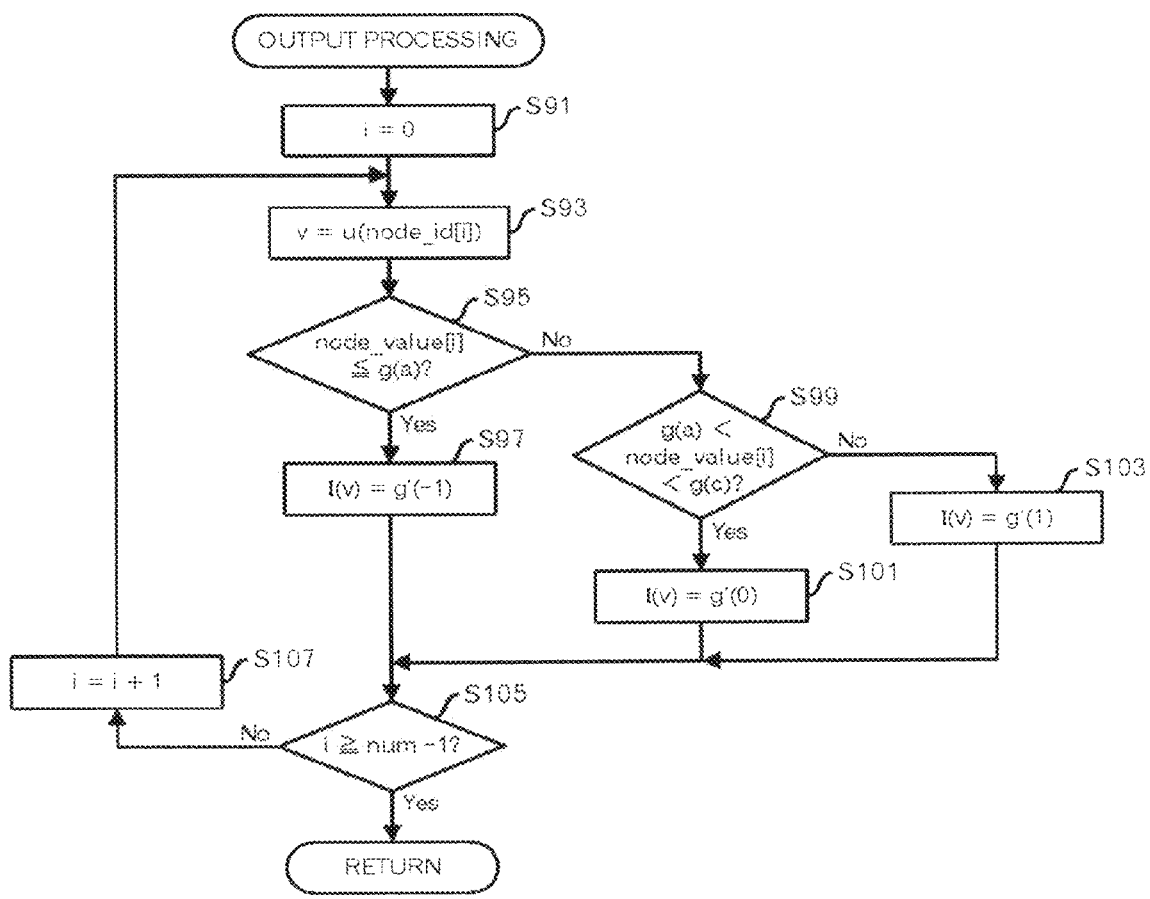
FIG. 14 is a diagram depicting a processing flow of an output processing.
Figure 13:
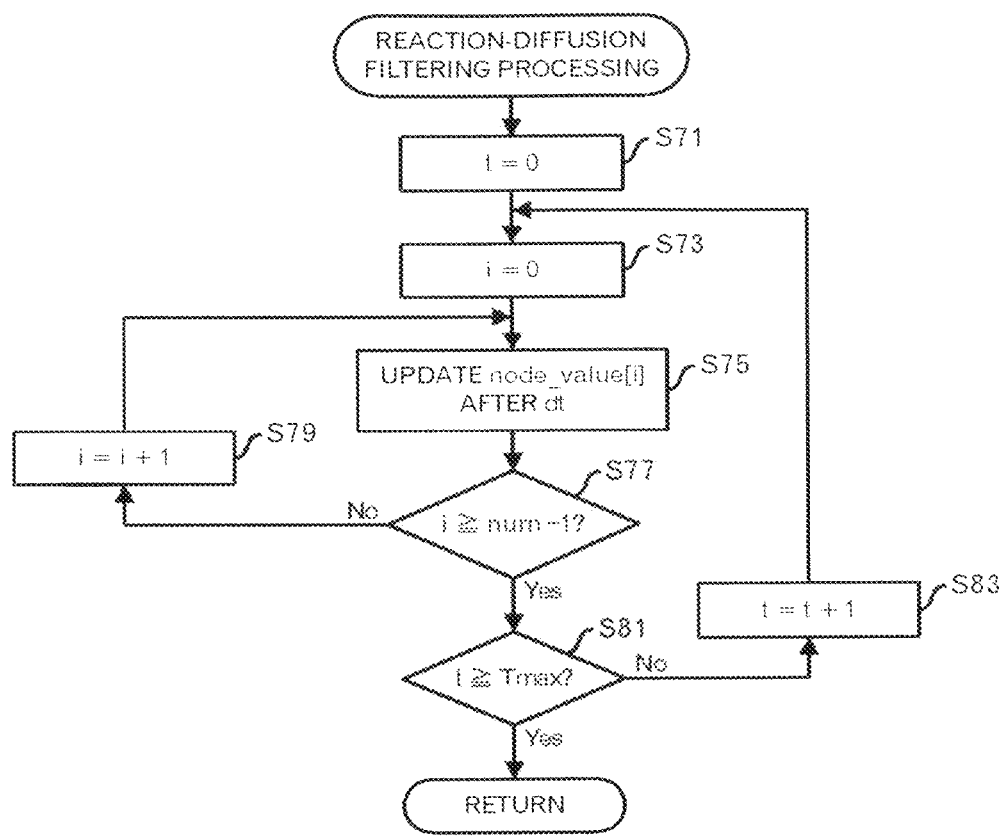
FIG. 13 is a diagram depicting a processing flow of a reaction-diffusion filtering processing.

For example, in case of v=(1, 2) in the voxel data illustrated in FIG. 9, the adjacent voxels (whose voxel numbers are 10, 7, 2 and 5) as illustrated in FIG. 12 are processed.

When the condition at the step S47 is satisfied, the converter 104 sets an array to keep the node number of the adjacent voxel e[i][j]=voxel_id [u' (v+m[j])] (step S49). Then, the processing shifts to step S57.

When the condition at the step S47 is not satisfied, the converter 104 determines whether or not the brightness value I(v+m[j]) of the adjacent voxel v+m[j] is equal to or less than the lower limit value I_low (step S51). When the brightness value I(v+m[j]) is equal to or less than the lower limit value I_low, the converter 104 sets the array to keep the node number of the adjacent voxel e[i][j]=num+1 (step S53). Hence, by node_value[num+1], g(I_low) is obtained. Then, the processing shifts to the step S57.

On the other hand, when the condition at the step S51 is not satisfied, because I(v+m[j]) is equal to or greater than the upper limit value I_high, the converter 104 sets the array to keep the node number of the adjacent voxel e[i][j]=num (step S55). Hence, by node_value[num], g(I_high) is obtained. Then, the processing shifts to the step S57.

After that, the converter 104 determines whether or not j becomes equal to or greater than 5 (step S57). In case of the three-dimensional space, the threshold is "5", however in case of the two-dimensional space, the threshold is "3". When j is less than "5", the converter 104 increments j by "1" (step S59), and the processing returns to the step S47.

On the other hand, when j is equal to or greater than 5, the converter 104 determines whether or not i reached num-1 (step S61). When i is less than num-1, the converter 104 increments i by "1" (step S63), and the processing returns to the step S45. On the other hand, when i reached num-1, the processing returns to the calling-source processing.

When performing such a processing, in the example in FIG. 12, e[6][0] designates a voxel with hatching, which has the voxel number "10". Therefore, e[6][0]=6. In addition, e[6][1] designates a black voxel having the voxel number "7", therefore e[6][1]=11 (the node number of the voxel whose brightness value is equal to or greater than the upper limit value I_high.). Furthermore, e[6][2] designates a black voxel having the voxel number "2", therefore, e[6][2]=11. Moreover, e[6][3] designates a voxel with hatching, which has the voxel number "5", and e[6][3]=3. Similar setting is performed for other voxels.

By performing such a processing, the node number can be obtained from the voxel number, and furthermore, a value corresponding to the brightness value can be obtained from the node number. Furthermore, the node number of a node corresponding to the adjacent voxel can be obtained. In other words, node data that has a graph structure has been generated. This node data is stored in the second data storage unit 105.

Returning to the explanation of the processing in FIG. 5, the filter processing unit 106 execute the reaction-diffusion filtering processing using data stored in the second data storage unit 105 (step S5). The reaction-diffusion filtering processing will be explained by using FIG. 13.

The filter processing unit 106 initializes a counter t for the time to "0" (step S71). Moreover, the filter processing unit 106 initializes a counter i for the node number to "0" (step S73). Then, the filter processing unit 106 updates node_value[i] after dt by a following equation, and stores the calculation result into the third data storage unit 107 (step S75).

In other words, the discretized reaction-diffusion equation is used as follows:

node_value[i]+=dt{α*f(node_value[i])+β*
(node_value[e[i][0]]+node_value[e[i][1]]+
node_value[e[i][2]]+node_value[e[i][3]]+
node_value[e[i][4]]+node_value[e[i][5]]−
6*node_value[i])} dt, α and β are parameters stored in the setting data storage unit 103. Furthermore, f(x) is a function as follows:

f(x)=−(x+1)(x−g(a))(x−g(b))(x−g(c))(x−1)

a, b and c are parameters stored in the setting data storage unit 103. The relationship "a<b<c" is established. This equation is a function for three-value separation, in other words, when three regions are extracted. Therefore, in case of two-value separation or four or more value separation, other functions are used as described in the background art.

Then, the filter processing unit 106 determines whether or not i becomes equal to or greater then num-1 (step S77). When i is less than num-1, the filter processing unit 106 increments i by "1" (step S79), and the processing returns to the step S75. In other words, at the same time, a value corresponding to the brightness value is calculated for all nodes within the region to be focused on.

On the other hand, when i is equal to or greater than num-1, the filter processing unit 106 determines whether or not t becomes equal to or greater than Tmax (step S81). When t is less than Tmax, the filter processing unit 106 increments t by "1" (step S83), and the processing returns to the step S73.

On the other hand, when t becomes equal to or greater than Tmax, the processing returns to the calling-source processing.

By performing the aforementioned processing, the region extraction processing is performed.

Returning to the explanation of the processing in FIG. 5, the output processing unit 108 performs an output processing by using data stored in the third data storage unit 107 (step S7). The output processing will be explained by using FIG. 14.

The output processing unit 108 initializes a counter i for the node number to "0" (step S91). Then, the output processing unit 108 obtains the voxel coordinate value corresponding to the node number i by v=u(node_id[i]) (step S93).

Moreover, the output processing unit 108 determines whether or not the node value node_value[i] is equal to or less than g(a) (step S95).

When the condition at the step S95 is satisfied, the output processing unit 108 sets the brightness value g'(−1) (or region ID "−1") to I(v) (step S97). In other words, the brightness value corresponding to the lower limit value "−1" for the reaction-diffusion equation is set to I(v). Then, the processing shifts to the step S105.

On the other hand, when the condition at the step S95 is not satisfied, the output processing unit 108 determines whether or not the node value node_value[i] is greater than g(a) and less than g(c) (step S99). When this condition is satisfied, the output processing unit 108 sets the brightness value g'(0) (or region ID "0") to I(v) (step S101). In other words, the brightness value corresponding to the median "0" for the reaction-diffusion equation is set to I(v). Then, the processing shifts to the step S105.

On the other hand, when the condition at the step S99 is not satisfied, because node_value[i] is equal to or greater than g(c), the output processing unit 108 sets the upper limit value g'(1) (or region ID "1") to I(v) (step S103). In other words, the brightness value corresponding to the upper limit value "1" for the reaction-diffusion equation is set to I(v). Then, the processing shifts to the step S105.

After that, the output processing unit 108 determines whether or not i reached num-1 (step S105). When i does not reach num-1, the output processing unit 108 increments i by "1" (step S107), and the processing returns to the step S93.

On the other hand, when i becomes equal to or greater than num-1, the processing returns to the calling-source processing.

By performing the aforementioned processing, the brightness values are classified into g(0), g(−1) or g(1).

In case where the region ID is set, after converting into an arbitrary brightness value that is preset for each of the region IDs, the rendering processing is performed.

The output processing unit 108 performs a predetermined rendering processing by using the brightness values of the voxels corresponding to the node (except for num and num+1), which are stored in the third data storage unit 107, and the brightness values of the other voxels, which are stored in the second data storage unit 105 (step S9). Because this processing is the same as the conventional technique, the further explanation is omitted. As also described above, when the region ID is set to I(v), the rendering is performed for the display apparatus 109 after converting to the arbitrary brightness value corresponding to each of the region IDs.

Figure 15:
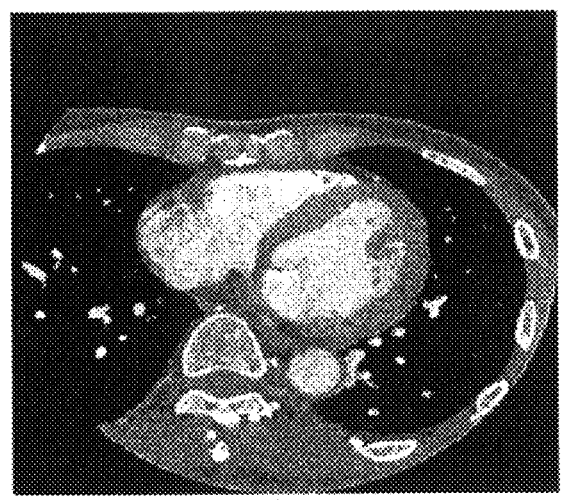
FIG. 15 is a diagram depicting an example of a tomographic image before the processing.
Figure 16:
FIG. 16 is a diagram depicting an example of a tomographic image after the processing.

For example, when the aforementioned processing is performed for the voxel data illustrated in FIG. 15, an image as illustrated in FIG. 16 is obtained. Thus, it becomes possible to obtain the image in which black regions, light gray regions and deep gray regions are clearly separated.

By performing the aforementioned processing, because the calculation processing by the reaction-diffusion equation is performed for the limited voxels within the region to be focused on, the calculation processing amount is decreased, and the processing time is shortened.

Although the embodiment of this invention was explained, this invention is not limited to this. For example, as for the processing flow, as long as the processing results do not change, the turns of the steps may be exchanged, or plural steps may be executed in parallel.

Moreover, the functional block diagram is a mere example, and does not correspond to the program module configuration.

Furthermore, the aforementioned information processing apparatus 100 is not one computer, and may be implemented by plural computers. Furthermore, the information processing apparatus 100 may be connected to the medical imaging equipment or the like via the network.

Figure 17:
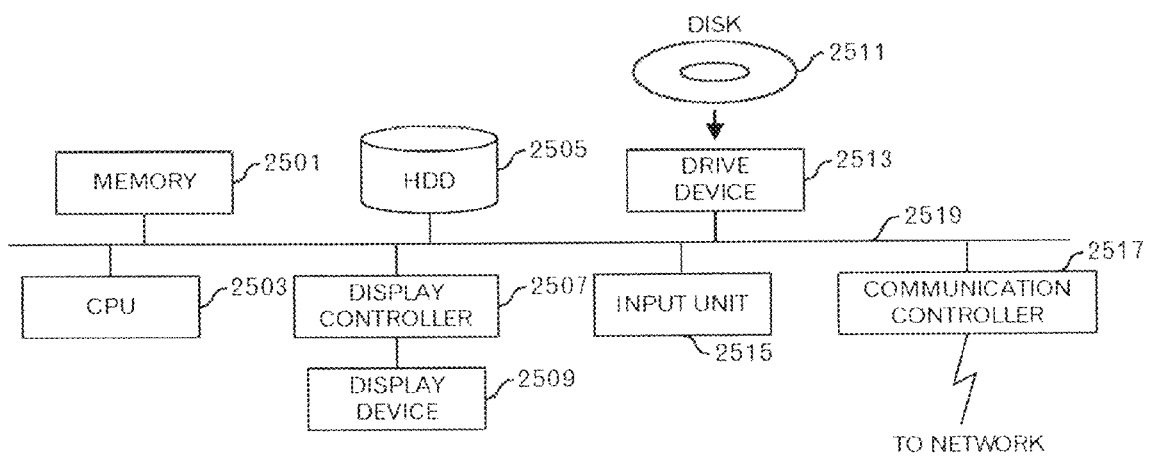
FIG. 17 is a functional block diagram of a computer.

In addition, the aforementioned information processing apparatus 100 is a computer device as illustrated in FIG. 17. That is, a memory 2501 (storage device), a CPU 2503 (processor), a hard disk drive (HOD) 2505, a display controller 2507 connected to a display device 2509, a drive device 2513 for a removable disk 2511, an input unit 2515, and a communication controller 2517 for connection with a network are connected through a bus 2519 as illustrated in FIG. 17. An operating system (OS) and an application program for carrying out the foregoing processing in the embodiment, are stored in the HDD 2505, and when executed by the CPU 2503, they are read out from the HOD 2505 to the memory 2501. As the need arises, the CPU 2503 controls the display controller 2507, the communication controller 2517, and the drive device 2513, and causes them to perform predetermined operations. Moreover, intermediate processing data is stored in the memory 2501, and if necessary, it is stored in the HDD 2505. In this embodiment of this technique, the application program to realize the aforementioned functions is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the application programs systematically cooperate with each other, so that various functions as described above in details are realized.

The aforementioned embodiments of this invention are outlined as follows:

An information processing method relating an aspect of the embodiments includes: (A) converting voxel data stored in a data storage unit to node data in which a voxel of the voxel data, which has a brightness value that is outside a certain brightness value range to be focused on, is set as a first node that represents that the brightness value of the voxel is outside the certain brightness value range, and a voxel of the voxel data, which has a brightness value that is within the certain brightness value range, is set as a second node that has a capability to extract relating nodes that are based on a neighborhood relationship between voxels; (B) performing, for each second node included in the node data, a calculation processing to calculate an output value of a reaction-diffusion equation by using a value corresponding to a brightness value of the second node and values corresponding to brightness values of relating nodes extracted from the second node, a predetermined number of times; and (C) determining a brightness value of each second node from the output value of the reaction-diffusion equation after performing the calculation processing the predetermined number of times.

Thus, because values that correspond to the brightness values and are changed by the reaction-diffusion equation, are limited to those of the second nodes, it is possible to reduce the calculation amount by reducing the calculation amount for the first node and to enhance the processing speed.

Furthermore, the aforementioned converting may include: calculating and storing, for each second node, a corresponding value within a value range of the reaction-diffusion equation from the brightness value of the second node. Although the same processing may be performed in the calculating, the processing is simplified by this configuration, and the speed of the processing can be enhanced.

Moreover, the aforementioned converting may include: (a1) setting voxels that have a brightness value that is equal to or greater than an upper limit value of the certain brightness value range as one third node included in first nodes; (a2) setting voxels that have a brightness value that is equal to or less than a lower limit value of the certain brightness value range as one fourth node included in the first nodes; (a3) setting (or storing) a value corresponding to the upper limit value within a value range of the reaction-diffusion equation to the third node; and (a4) setting (or storing) a value corresponding to the lower limit value within the value range of the reaction-diffusion equation to the fourth node. Thus, it is possible to appropriately perform the calculation by the reaction-diffusion equation, and to appropriately extract the regions.

Furthermore, the aforementioned performing may include (c1) upon detecting that the output value of the reaction-diffusion equation after performing the calculation processing the predetermined number of times is equal to or less than a first value corresponding to a first coefficient used in the reaction-diffusion equation, changing the brightness value of the second node to a first brightness value for a first region to be extracted; (c2) upon detecting that the output value of the reaction-diffusion equation after performing the calculation processing the predetermined number of times is equal to or greater than a second value corresponding to a second coefficient used in the reaction-diffusion equation, changing the brightness value of the second node to a second brightness value for a second region to be extracted; and (c3) upon detecting that the output value of the reaction-diffusion equation after performing the calculation processing the predetermined number of times is greater than the first value and less than the second value, changing the brightness value of the second node to a third brightness value for a third region to be extracted.

Thus, even when the predetermined number of times is not so great value, it is possible to appropriately extract the regions.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An image processing method, comprising:
converting, by using a computer, voxel data of tomographic images to node data in which a voxel of the voxel data, which has a brightness value that is equal to or greater than an upper limit value of a certain brightness value range to be focused on, is set as a first node whose value corresponds to the upper limit value and is within a value range of a reaction-diffusion equation, a voxel of the voxel data, which has a brightness value that is equal to or less than a lower limit value of the certain brightness value range, is set as a second node whose value corresponds to the lower limit value and is within the value range of the reaction-diffusion equation, and a voxel of the voxel data, which has a brightness value that is within the certain brightness value range, is set as a third node that has a capability to extract relating nodes that are based on a neighborhood relationship between voxels;
performing, by using the computer and for each third node included in the node data, a calculation processing to calculate an output value of the reaction-diffusion equation by using a value corresponding to a brightness value of the third node and values corresponding to brightness values of relating nodes extracted from the third node, a predetermined number of times;
determining, by using the computer, a brightness value of each third node from the output value of the reaction-diffusion equation after performing the calculation processing the predetermined number of times; and
another performing, by using the computer, a rendering processing by using a brightness value of each first node, a brightness value of each second node and the brightness value of each third node.

2. The image processing method as set forth in claim 1, wherein the converting comprises:
calculating, for each third node, a corresponding value within the value range of the reaction-diffusion equation from the brightness value of the third node.

3. The image processing method as set forth in claim 1, wherein the performing comprises:
upon detecting that the output value of the reaction-diffusion equation after performing the calculation processing the predetermined number of times is equal to or less than a first value corresponding to a first coefficient used in the reaction-diffusion equation, changing the brightness value of the third node to a first brightness value for a first region to be extracted;
upon detecting that the output value of the reaction-diffusion equation after performing the calculation processing the predetermined number of times is equal to or greater than a second value corresponding to a second coefficient used in the reaction-diffusion equation, changing the brightness value of the third node to a second brightness value for a second region to be extracted; and
upon detecting that the output value of the reaction-diffusion equation after performing the calculation processing the predetermined number of times is greater than the first value and less than the second value, changing the brightness value of the third node to a third brightness value for a third region to be extracted.

4. An image processing method, comprising:
converting, by using a computer, voxel data of tomographic images to node data in which a voxel of the voxel data, which has a brightness value that is outside a certain brightness value range to be focused on, is set as a first node that represents that the brightness value of the voxel is outside the certain brightness value range, and a voxel of the voxel data, which has a brightness value that is within the certain brightness value range, is set as a second node that has a capability to extract relating nodes that are based on a neighborhood relationship between voxels;
performing, by using the computer and for each second node included in the node data, a calculation processing to calculate an output value of a reaction-diffusion equation by using a value corresponding to a brightness value of the second node and values corresponding to brightness values of relating nodes extracted from the second node, a predetermined number of times;
determining, by using the computer, a brightness value of each second node from the output value of the reaction-diffusion equation after performing the calculation processing the predetermined number of times; and
another performing, by using the computer, a rendering processing by using a brightness value of each first node and the brightness value of each second node,
wherein the performing comprises:
upon detecting that the output value of the reaction-diffusion equation after performing the calculation processing the predetermined number of times is equal to or less than a first value corresponding to a first coefficient used in the reaction-diffusion equation, changing the brightness value of the second node to a first brightness value for a first region to be extracted;
upon detecting that the output value of the reaction-diffusion equation after performing the calculation processing the predetermined number of times is equal to or greater than a second value corresponding to a second coefficient used in the reaction-diffusion equation, changing the brightness value of the second node to a second brightness value for a second region to be extracted; and
upon detecting that the output value of the reaction-diffusion equation after performing the calculation processing the predetermined number of times is greater than the first value and less than the second value, changing the brightness value of the second node to a third brightness value for a third region to be extracted.

5. The image processing method as set forth in claim 4, wherein the converting comprises:
calculating, for each second node, a corresponding value within a value range of the reaction-diffusion equation from the brightness value of the second node.

6. The image processing method as set forth in claim 4, wherein the converting comprises:

setting voxels that have a brightness value that is equal to or greater than an upper limit value of the certain brightness value range as one third node included in first nodes;

setting voxels that have a brightness value that is equal to or less than a lower limit value of the certain brightness value range as one fourth node included in the first nodes;

setting a value that corresponds to the upper limit value and is within a value range of the reaction-diffusion equation to the third node; and setting a value that corresponds to the lower limit value and is within the value range of the reaction-diffusion equation to the fourth node.

7. An image processing apparatus, comprising:
a memory; and
a processor coupled to the memory and configured to:
  convert voxel data of tomographic images to node data in which a voxel of the voxel data, which has a brightness value that is equal to or greater than an upper limit value of a certain brightness value range to be focused on, is set as a first node whose value corresponds to the upper limit value and is within a value range of a reaction-diffusion equation, a voxel of the voxel data, which has a brightness value that is equal to or less than a lower limit value of the certain brightness value range, is set as a second node whose value corresponds to the lower limit value and is within the value range of the reaction-diffusion equation, and a voxel of the voxel data, which has a brightness value that is within the certain brightness value range, is set as a third node that has a capability to extract relating nodes that are based on a neighborhood relationship between voxels;
  perform, for each third node included in the node data, a calculation processing to calculate an output value of the reaction-diffusion equation by using a value corresponding to a brightness value of the third node and values corresponding to brightness values of relating nodes extracted from the third node, a predetermined number of times;
  determine a brightness value of each third node from the output value of the reaction-diffusion equation after performing the calculation processing the predetermined number of times; and
  another perform a rendering processing by using a brightness value of each first node, a brightness value of each second node and the brightness value of each third node.

8. The image processing apparatus as set forth in claim 7, wherein, with respect to the convert, the processor is further configured to:
  calculate, for each third node, a corresponding value within the value range of the reaction-diffusion equation from the brightness value of the third node.

9. The image processing apparatus as set forth in claim 7, wherein, with respect to the perform, the processor is further configured to:
  upon detecting that the output value of the reaction-diffusion equation after performing the calculation processing the predetermined number of times is equal to or less than a first value corresponding to a first coefficient used in the reaction-diffusion equation, change the brightness value of the third node to a first brightness value for a first region to be extracted;
  upon detecting that the output value of the reaction-diffusion equation after performing the calculation processing the predetermined number of times is equal to or greater than a second value corresponding to a second coefficient used in the reaction-diffusion equation, change the brightness value of the third node to a second brightness value for a second region to be extracted; and
  upon detecting that the output value of the reaction-diffusion equation after performing the calculation processing the predetermined number of times is greater than the first value and less than the second value, change the brightness value of the third node to a third brightness value for a third region to be extracted.

10. An image processing apparatus, comprising:
a memory; and
a processor coupled to the memory and configured to:
  convert voxel data of tomographic images to node data in which a voxel of the voxel data, which has a brightness value that is outside a certain brightness value range to be focused on, is set as a first node that represents that the brightness value of the voxel is outside the certain brightness value range, and a voxel of the voxel data, which has a brightness value that is within the certain brightness value range, is set as a second node that has a capability to extract relating nodes that are based on a neighborhood relationship between voxels;
  perform, for each second node included in the node data, a calculation processing to calculate an output value of a reaction-diffusion equation by using a value corresponding to a brightness value of the second node and values corresponding to brightness values of relating nodes extracted from the second node, a predetermined number of times;
  determine a brightness value of each second node from the output value of the reaction-diffusion equation after performing the calculation processing the predetermined number of times; and
  another perform a rendering processing by using a brightness value of each first node and the brightness value of each second node,
wherein the perform comprises:
  upon detecting that the output value of the reaction-diffusion equation after performing the calculation processing the predetermined number of times is equal to or less than a first value corresponding to a first coefficient used in the reaction-diffusion equation, the processor is further configured to change the brightness value of the second node to a first brightness value for a first region to be extracted;
  upon detecting that the output value of the reaction-diffusion equation after performing the calculation processing the predetermined number of times is equal to or greater than a second value corresponding to a second coefficient used in the reaction-diffusion equation, the processor is further configured to change the brightness value of the second node to a second brightness value for a second region to be extracted; and
  upon detecting that the output value of the reaction-diffusion equation after performing the calculation processing the predetermined number of times is greater than the first value and less than the second value, the processor is further configured to change the brightness value of the second node to a third brightness value for a third region to be extracted.

11. The image processing apparatus as set forth in claim 10, wherein, with respect to the convert, the processor is further configured to:
calculate, for each second node, a corresponding value within a value range of the reaction-diffusion equation from the brightness value of the second node.

12. The image processing apparatus as set forth in claim 10, wherein, with respect to the convert, the processor is further configured to:
set voxels that have a brightness value that is equal to or greater than an upper limit value of the certain brightness value range as one third node included in first nodes;
set voxels that have a brightness value that is equal to or less than a lower limit value of the certain brightness value range as one fourth node included in the first nodes;
set a value that corresponds to the upper limit value and is within a value range of the reaction-diffusion equation to the third node; and
set a value that corresponds to the lower limit value and is within the value range of the reaction-diffusion equation to the fourth node.

13. A non-transitory computer-readable storage medium storing an image processing program for causing a computer to execute a process, the process comprising:
converting voxel data of tomographic images to node data in which a voxel of the voxel data, which has a brightness value that is equal to or greater than an upper limit value of a certain brightness value range to be focused on, is set as a first node whose value corresponds to the upper limit value and is within a value range of a reaction-diffusion equation, a voxel of the voxel data, which has a brightness value that is equal to or less than a lower limit value of the certain brightness value range, is set as a second node whose value corresponds to the lower limit value and is within the value range of the reaction-diffusion equation, and a voxel of the voxel data, which has a brightness value that is within the certain brightness value range, is set as a third node that has a capability to extract relating nodes that are based on a neighborhood relationship between voxels;
performing, for each third node included in the node data, a calculation processing to calculate an output value of the reaction-diffusion equation by using a value corresponding to a brightness value of the third node and values corresponding to brightness values of relating nodes extracted from the third node, a predetermined number of times;
determining a brightness value of each third node from the output value of the reaction-diffusion equation after performing the calculation processing the predetermined number of times; and
another performing a rendering processing by using a brightness value of each first node, a brightness value of each second node and the brightness value of each third node.

14. The non-transitory computer-readable storage medium as set forth in claim 13, wherein the converting comprises:
calculating, for each third node, a corresponding value within the value range of the reaction-diffusion equation from the brightness value of the third node.

15. The non-transitory computer-readable storage medium as set forth in claim 13, wherein the performing comprises:
upon detecting that the output value of the reaction-diffusion equation after performing the calculation processing the predetermined number of times is equal to or less than a first value corresponding to a first coefficient used in the reaction-diffusion equation, changing the brightness value of the third node to a first brightness value for a first region to be extracted;
upon detecting that the output value of the reaction-diffusion equation after performing the calculation processing the predetermined number of times is equal to or greater than a second value corresponding to a second coefficient used in the reaction-diffusion equation, changing the brightness value of the third node to a second brightness value for a second region to be extracted; and
upon detecting that the output value of the reaction-diffusion equation after performing the calculation processing the predetermined number of times is greater than the first value and less than the second value, changing the brightness value of the third node to a third brightness value for a third region to be extracted.

16. A non-transitory computer-readable storage medium storing an image processing program for causing a computer to execute a process, the process comprising:
converting voxel data of tomographic images to node data in which a voxel of the voxel data, which has a brightness value that is outside a certain brightness value range to be focused on, is set as a first node that represents that the brightness value of the voxel is outside the certain brightness value range, and a voxel of the voxel data, which has a brightness value that is within the certain brightness value range, is set as a second node that has a capability to extract relating nodes that are based on a neighborhood relationship between voxels;
performing, for each second node included in the node data, a calculation processing to calculate an output value of a reaction-diffusion equation by using a value corresponding to a brightness value of the second node and values corresponding to brightness values of relating nodes extracted from the second node, a predetermined number of times;
determining a brightness value of each second node from the output value of the reaction-diffusion equation after performing the calculation processing the predetermined number of times; and
another performing a rendering processing by using a brightness value of each first node and the brightness value of each second node,
wherein the performing comprises:
upon detecting that the output value of the reaction-diffusion equation after performing the calculation processing the predetermined number of times is equal to or less than a first value corresponding to a first coefficient used in the reaction-diffusion equation, changing the brightness value of the second node to a first brightness value for a first region to be extracted;
upon detecting that the output value of the reaction-diffusion equation after performing the calculation processing the predetermined number of times is equal to or greater than a second value corresponding to a second coefficient used in the reaction-diffusion equation, changing the brightness value of the second node to a second brightness value for a second region to be extracted; and upon detecting that the output value of the reaction-diffusion equation after performing the calculation processing the predetermined number of times is greater than the first value and less than the second value, changing the brightness value of the second node to a third brightness value for a third region to be extracted.

17. The non-transitory computer-readable storage medium as set forth in claim 16, wherein the converting comprises:
    calculating, for each second node, a corresponding value within a value range of the reaction-diffusion equation from the brightness value of the second node.

18. The non-transitory computer-readable storage medium as set forth in claim 16, wherein the converting comprises:
    setting voxels that have a brightness value that is equal to or greater than an upper limit value of the certain brightness value range as one third node included in first nodes;
    setting voxels that have a brightness value that is equal to or less than a lower limit value of the certain brightness value range as one fourth node included in the first nodes;
    setting a value that corresponds to the upper limit value and is within a value range of the reaction-diffusion equation to the third node; and
    setting a value that corresponds to the lower limit value and is within the value range of the reaction-diffusion equation to the fourth node.

* * * * *